United States Patent [19]

Riefe et al.

[11] Patent Number: 5,605,352
[45] Date of Patent: Feb. 25, 1997

[54] ENERGY ABSORBING STEERING COLUMN

[75] Inventors: Richard K. Riefe, Saginaw; Kurt J. Hilbrandt, Hemlock; Howard D. Beauch, Frankenmuth, all of Mich.

[73] Assignee: General Motors Corporation, Detroit, Mich.

[21] Appl. No.: 569,539

[22] Filed: Dec. 8, 1995

[51] Int. Cl.$^6$ .................................................. B62D 1/11
[52] U.S. Cl. ............................................ 280/777; 74/492
[58] Field of Search ................................... 280/775, 777; 74/492

[56] References Cited

U.S. PATENT DOCUMENTS

| | | | |
|---|---|---|---|
| 4,838,576 | 6/1989 | Hamasaki | 280/777 |
| 4,901,592 | 2/1990 | Ito et al. | 74/492 |
| 4,951,522 | 8/1990 | Chowdhury et al. | 74/492 |
| 4,989,898 | 2/1991 | Yamaguchi et al. | 280/777 |
| 4,998,999 | 3/1991 | Yuzuriha et al. | 280/777 |
| 5,052,716 | 10/1991 | Matsumoto | 280/777 |
| 5,082,311 | 1/1992 | Metlotik | 280/777 |
| 5,088,768 | 2/1992 | Maruyama et al. | 280/777 |
| 5,228,359 | 7/1993 | Thomas | 74/492 |
| 5,487,562 | 1/1996 | Hedderly et al. | 280/777 |

OTHER PUBLICATIONS

Automotive Industries, "Components and Systems '95", p. 48.

Primary Examiner—Kenneth R. Rice
Attorney, Agent, or Firm—Saul Schwartz

[57] ABSTRACT

An energy absorbing steering column for a motor vehicle including a housing supported on a body structure of the vehicle for translation through a linear collapse stroke in response to an impact on a steering wheel of the steering column and an energy absorber. The energy absorber includes a flat metal ribbon having a first end anchored to the housing, an unrestrained second end, a preformed first undulation near the first end looped over a stationary first roller, and a preformed second undulation tangent to the first undulation looped over a floating second roller. The first and second undulations overlap each other and are confined between a pair of parallel containment walls of the steering column housing. As the steering column housing traverses its linear collapse stroke, the flat metal ribbon is plastically deformed to convert kinetic energy to work by being pulled sequentially over rotating anvils defined by at least one half of the circumference of the stationary first roller and at least one half of the circumference of the floating second roller.

2 Claims, 4 Drawing Sheets

ENERGY ABSORBING STEERING COLUMN

FIELD OF THE INVENTION

This invention relates to energy absorbing steering columns for motor vehicles.

BACKGROUND OF THE INVENTION

A typical energy absorbing steering column of a motor vehicle includes a housing, a steering shaft rotatably supported on the housing, and a steering wheel on the end of the steering shaft. The housing is releasable from a body structure of the motor vehicle on which it is mounted for translation through a linear collapse stroke in response to an impact on the steering wheel. During the collapse stroke of the housing, an energy absorber between the housing and the body structure converts into work a fraction of the kinetic energy of the impact. An energy absorber in a prior motor vehicle steering column, for example, includes a horizontal flat steel ribbon having one end anchored to the body structure of the motor vehicle and a preformed bump or undulation where the flat ribbon is guided over an anvil on the housing of the steering column. During the linear collapse stroke of the steering column housing, the anvil translates with the housing relative to the ribbon and effects plastic deformation of the ribbon as the anvil induces wave-like translation of the preformed bump along the length of the ribbon. A steering column according to this invention is an alternative to the steering column having the aforesaid horizontal flat steel ribbon.

SUMMARY OF THE INVENTION

This invention is a new and improved energy absorbing steering column for a motor vehicle including a housing supported on a body structure of the vehicle for translation through a linear collapse stroke in response to an impact on a steering wheel of the steering column and an energy absorber which converts into work a fraction of the kinetic energy of the impact. The energy absorber includes a flat metal ribbon having a first end anchored to the housing of the steering column, an unrestrained second end, a preformed or prebent first undulation near the first end looped over a stationary first roller, and a preformed or prebent second undulation tangent to the first undulation looped over a floating second roller. The first and second undulations overlap each other and are confined between a pair of parallel containment walls of the steering column housing. As the steering column housing traverses its linear collapse stroke, the flat metal ribbon is plastically deformed to convert kinetic energy to work by being pulled sequentially over anvils defined by at least one half of the circumference of the stationary first roller and at least one half of the circumference of the floating second roller. Each of the anvils defined by the stationary first roller and the floating second roller rotate to minimize friction between the rollers and the flat metal ribbon and the flat metal ribbon maintains separation between the first and second rollers at the point of tangency between the first and second undulations.

DESCRIPTION OF A PREFERRED EMBODIMENT

Figure 1:
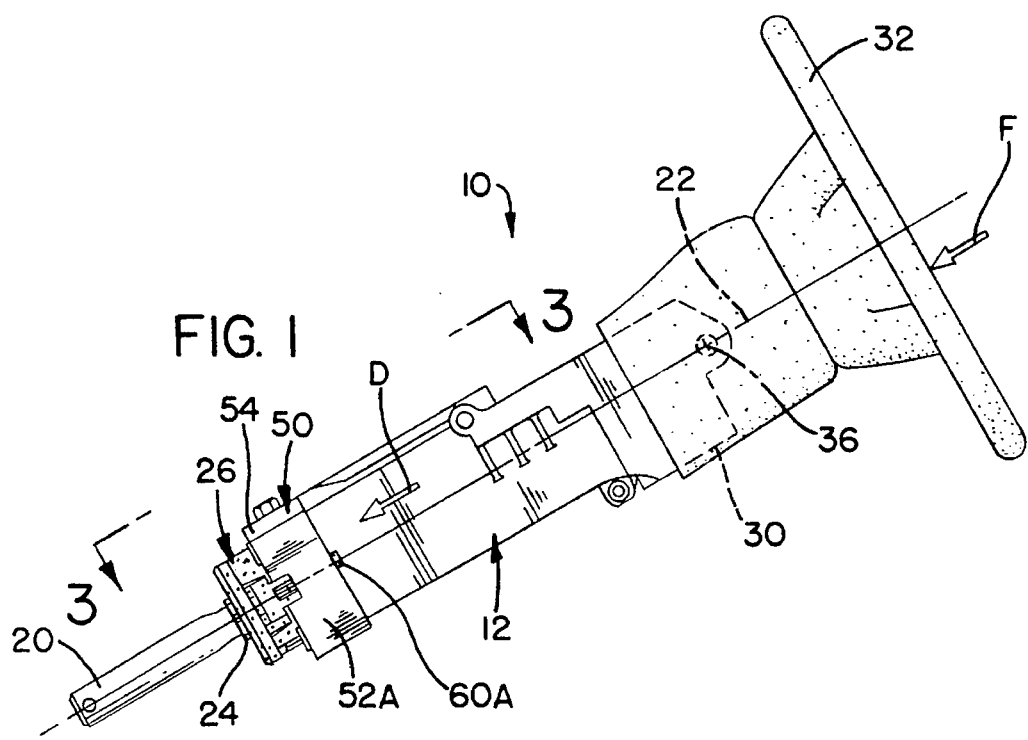
FIG. 1 is an elevational view of an energy absorbing motor vehicle steering column according to this invention.

Referring to FIGS. 1–4, an energy absorbing motor vehicle steering column 10 according to this invention includes a die cast housing 12 having a pair of vertical walls 14A–14B and a horizontal wall 16 reinforced from below by a plurality of integral gussets 18. A telescopically collapsible steering shaft 20 is supported on the housing 12 for rotation about a longitudinal centerline 22 thereof by a first bearing 24, FIG. 4, on a plastic bearing support 26 at an inboard end 28, FIG. 2, of the housing 12 and by a second bearing, not shown, at an enlarged and reinforced outboard end 30 of the housing 12.

A steering wheel 32 is connected to the steering shaft 20 and rotatably supported on a tilt-housing, not shown, of the steering column concealed behind a shroud 34. The tilt-housing is supported on the outboard end 30 of the housing 12 for up and down pivotal movement about a lateral centerline 36. A horizontal rod 40 is rigidly attached to the housing 12 parallel to the lateral centerline 36 with a pair of lateral ends 42A–42B of the rod protruding beyond a pair of lugs 44A–44B on the housing 12.

A body structure of the motor vehicle includes a pair of laterally separated, vertical hangers 46A–46B each of which terminates in a mushroom-shaped head 48. The body structure further includes a box-shaped bracket 50 longitudinally separated from the hangers 46A–46B having a pair of vertical sides 52A–52B outboard of the plastic bearing support 26, an upper horizontal side 54 above the housing 12, and a lower horizontal side 56 below the housing 12. The bracket 50 vertically supports the inboard end 28 of the housing 12 on the motor vehicle body structure. The outboard end 30 of the housing 12 is vertically supported on the body structure by the mushroom-shaped heads 48 of the hangers 46A–46B over which are hooked the lateral ends 42A–42B of the horizontal rod 40. A spring 58 around the rod 42 bears against the housing 12 and against the body structure to bias the rod 42 downward against the mushroom-shaped heads 48 on the hangers 46A–46B.

A pair of hooks 60A–60B on the plastic bearing support 26 seat against respective ones of a pair of edges 62A–62B of the vertical sides 52A–52B of the bracket 50 to normally prevent translation of the housing 12 in a collapse direction "D", FIG. 1, parallel to the longitudinal centerline 22 of the steering column. An impact on the steering column 10 of significant or extraordinary magnitude, however, represented by a resultant vector force "F" on the steering wheel 32, forces release of the hooks 60A–60B from the edges 62A–62B of the vertical sides so that the housing 12 and the bearing support 26 are released from the bracket 50 for linear translation in the collapse direction through a collapse stroke from a first position, FIGS. 1, 3 and 4, to a second position, FIGS. 5 and 6. Concurrently, the lateral ends 42A–42B of the horizontal rod 40 simply separate from the mushroom-shaped heads 48 of the hangers 46A–46B.

An energy absorber 64 between the steering column housing 12 and the body structure of the motor vehicle converts into work a fraction of the kinetic energy of the impact on the steering column represented by the vector force "F". The energy absorber 64 includes a pair of longitudinal containment walls 66A–66B on the housing 12 defined by the portions of the vertical walls 14A–14B protruding above the horizontal wall 16 and a flat metal ribbon 68 the plane of which is perpendicular to the horizontal wall 16. The flat metal ribbon 68 has a first end 70 rigidly attached to the housing 12 at an inboard end 72 of the containment wall 66B, an unrestrained second end 74, a prebent, loop-shaped, first undulation 76 near the first end 70 of the ribbon, and a prebent, loop-shaped, second undulation 78 tangent to the first undulation 76. The first undulation 76 is open in the collapse direction "D" and the second undulation 78 is open in the opposite direction. The sum of the diameters of the first and the second undulations 76, 78 exceeds a span dimension "X" of the housing 12 between the containment walls 66A–66B so that the first and second undulations overlap each other.

Figure 2:
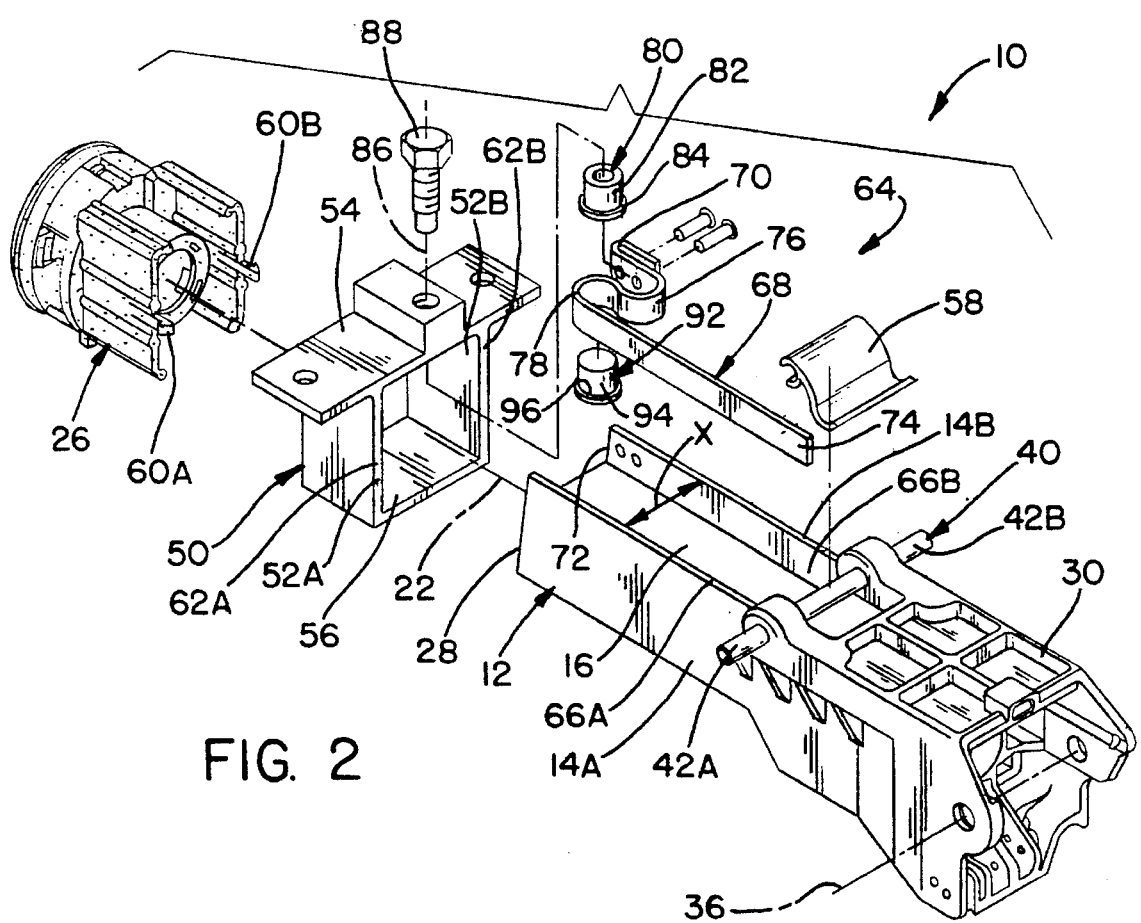
FIG. 2 is a fragmentary, exploded perspective view of the energy absorbing motor vehicle steering column according to this invention.
Figure 3:
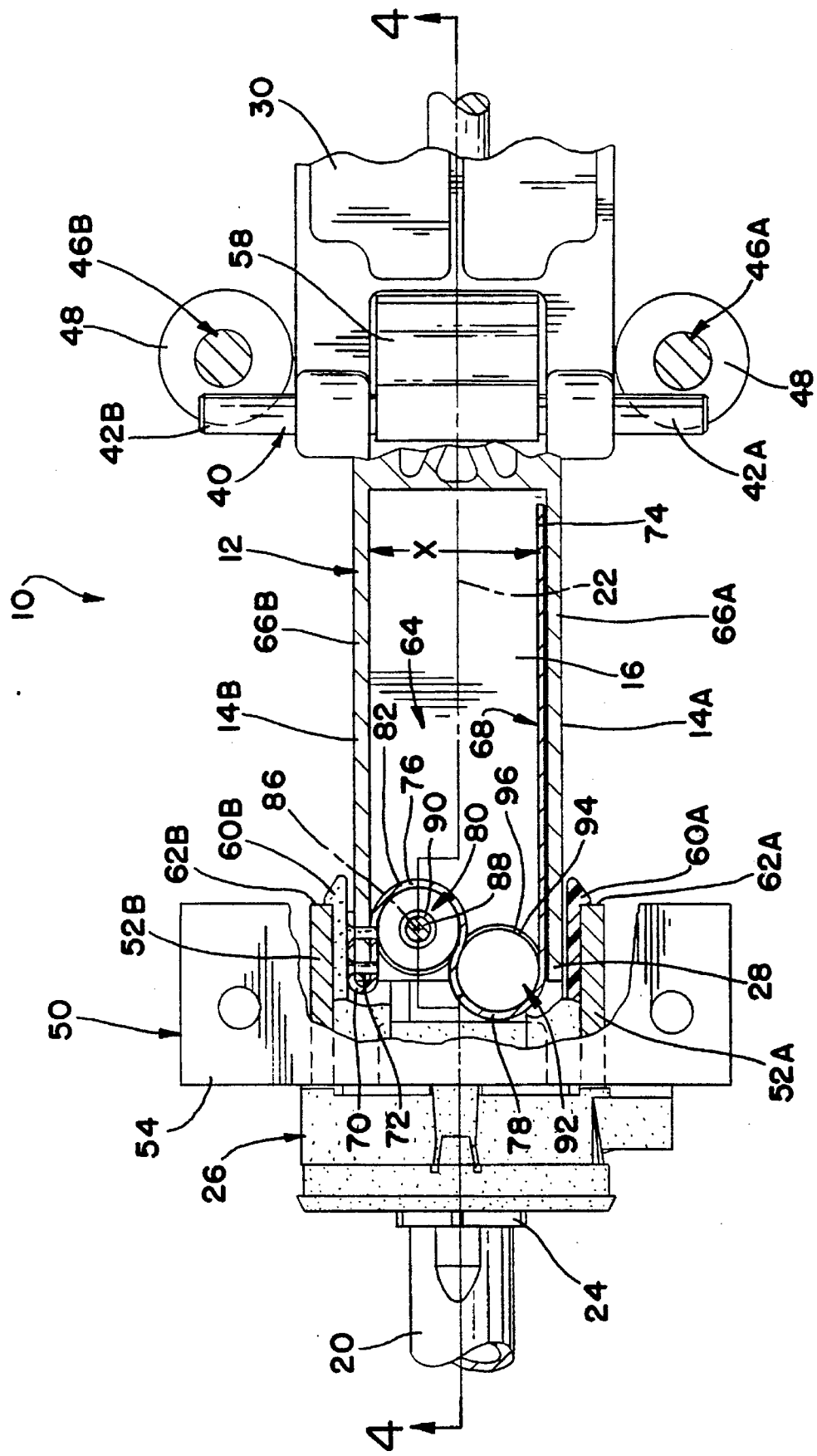
FIG. 3 is a partially broken-away view taken generally along the plane indicated by lines 3—3 in FIG. 1.
Figure 4:
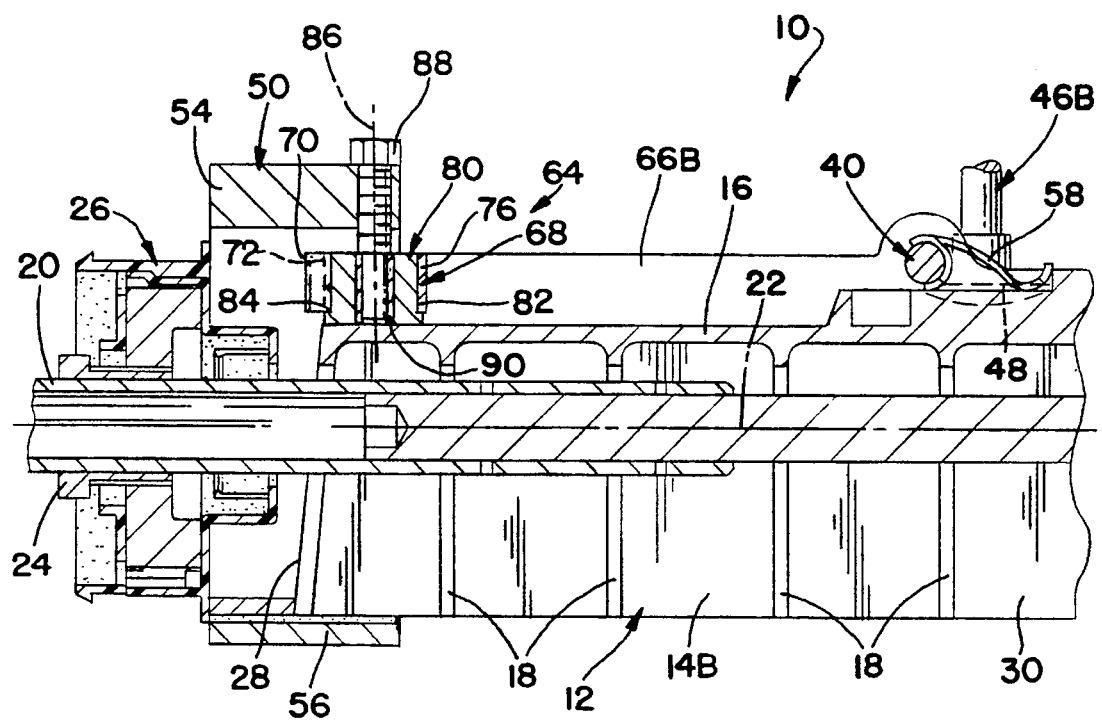
FIG. 4 is a sectional view taken generally along the plane indicated by lines 4—4 in FIG. 3.

As seen best in FIGS. 2–6, the first undulation 76 is looped around a stationary first roller 80 and seated in a circumferential groove 82 of the first roller 80 defined between the horizontal wall 54 of the bracket 50 and a shoulder 84 on the first roller, FIG. 2. The stationary first roller is supported on the body structure of the motor vehicle for rotation about a vertical centerline 86 by a bolt 88 rigidly attached to the box-shaped bracket 50 and by a sleeve bearing 90, FIGS. 4 and 6, between the roller and the bolt. The second undulation 78 is looped around a floating second roller 92 and seated in a circumferential groove 94 of the second roller 92 defined between the horizontal wall 54 of the bracket 50 and a shoulder 96 on the second roller. The radial depth of each of the circumferential grooves 82, 94 is less than the thickness of the flat metal ribbon 68 so that the ribbon protrudes radially outboard of the outside diameter of the stationary first roller 80 and the floating second roller 92 and is prevented by the grooves 82, 94 from becoming dislodged from the rollers.

Figure 6:
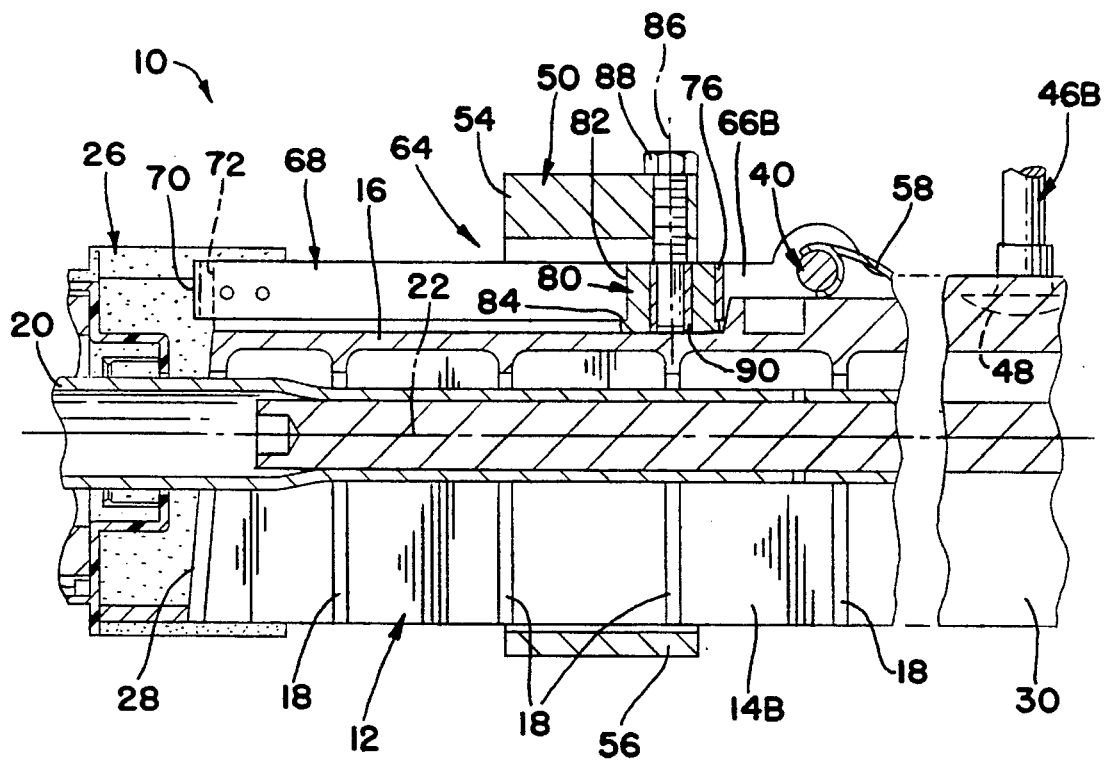
FIG. 6 is a sectional view taken generally along the plane indicated by lines 6—6 in FIG. 5.
Figure 5:
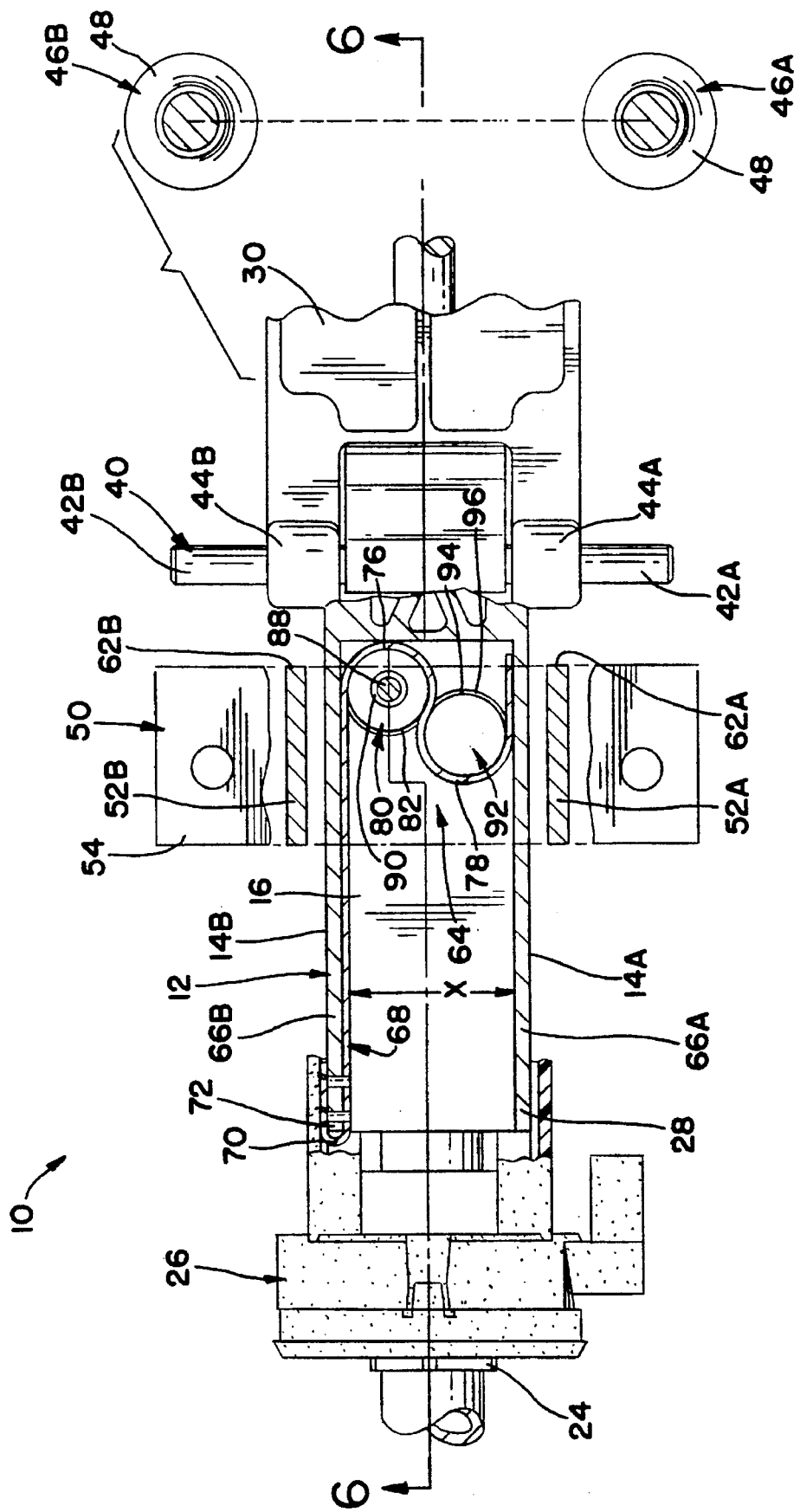
FIG. 5 is similar to FIG. 3 but showing structural elements of the energy absorbing motor vehicle steering column according to this invention in different positions.

In an energy absorbing collapse stroke of the steering column housing 12, an impact on the steering wheel 32 represented by the vector force "F" effects release of the steering column housing 12 from the body structure of the vehicle as described above and linear translation of the housing from its first position, FIGS. 1–4, to its second position, FIGS. 5–6. Concurrently, the first end 70 of the flat metal ribbon 68 translates with the steering column housing 12 to effect energy absorption by plastic deformation of the flat metal ribbon 68 by pulling the ribbon sequentially over an anvil defined by a segment of the circumference of the stationary first roller 80 constituting at least one half of the circumference of the first roller and over an anvil defined by a segment of the circumference of the floating second roller 92 constituting at least one half of the circumference of the second roller. By sequentially pulling the flat metal ribbon 68 over at least one half of the circumference of each of the rollers 80, 92, the ribbon is bent through an angle of at least 180° as the first and second undulations 76, 78 traverse the length of the flat metal ribbon in wave-like fashion toward the unrestrained end 74 of the ribbon.

During the energy absorbing collapse stroke of the housing 12, the anvil defined by each of the stationary first roller 80 and the floating second roller 92 rotates to minimize friction between the flat metal ribbon 68 and the rollers. By minimizing such friction, the performance of the energy absorber 64 is rendered more predictable over the operational life of the steering column 10. The floating second roller 92 is prevented from being expelled from the second undulation 78 because the containment wall 66A and the stationary first roller 80 cooperate to prevent lateral expansion of the second undulation 78. Importantly, the flat metal ribbon 68 maintains separation between the stationary first roller 80 and the floating second roller 92 at the point of tangency between the first and second undulations to prevent abrasion between the rollers and to prevent the second roller 92 from becoming wedged between the first roller and the containment wall 66A.

We claim:

1. An energy absorbing steering column for a motor vehicle including a housing, a steering shaft rotatably supported on said housing, a steering wheel rotatable as a unit with said steering shaft, means operative to mount said housing on a body structure of said motor vehicle for linear translation through a collapse stroke in response to in impact on said steering wheel, and an energy absorber between said housing and said body structure of said motor vehicle operative during said linear collapse stroke of said housing to convert into work a fraction of the kinetic energy of the impact on said steering wheel, characterized in that said energy absorber comprises:

a pair of parallel containment walls on said housing separated by a span dimension, a flat metal ribbon between said pair of containment walls having a first end and a loop-shaped first undulation adjacent to and open toward said first end and a loop-shaped second undulation tangent to said first undulation open in a direction opposite said first undulation, the sum of the diameters of said first and said second undulations exceeding said span dimension between said containment walls so that said first and said second undulations overlap each other, a first roller in said first undulation supported on said body structure of said motor vehicle for rotation about a stationary centerline engaging said flat metal ribbon over at least one half of the circumference of said first roller, a second roller in said second undulation engaging said flat metal ribbon over at least one half of the circumference of said second roller, and means operative to rigidly connect said first end of said flat metal ribbon to said housing so that said flat metal ribbon is pulled sequentially over a pair of rotating anvils defined by said first and said second rollers during said collapse stroke of said housing while said second undulation is prevented from expanding and releasing said second roller by said first roller and one of said pair of containment walls.

2. The energy absorbing steering column recited in claim 1 wherein said energy absorber further comprises:

a circumferential groove in said first roller receiving said flat metal ribbon to prevent dislodgment of said flat metal ribbon from said first roller having a radial depth less than the thickness of said flat metal ribbon so that said flat metal ribbon projects beyond the outside diameter of said first roller, and a circumferential groove in said second roller receiving said flat metal ribbon to prevent dislodgment of said flat metal ribbon from said second roller having a radial depth less than the thickness of said flat metal ribbon so that said flat metal ribbon projects beyond the outside diameter of said second roller, said flat metal ribbon positively separating said first roller from said second roller where said first undulation is tangent to said second undulation.

* * * * *